United States Patent [19]

Donnerstag

[11] Patent Number: 5,269,710
[45] Date of Patent: Dec. 14, 1993

[54] LAY-IN LUG

[75] Inventor: Leonard Donnerstag, Atlanta, Ga.

[73] Assignee: Siemens Energy & Automation, Inc., Alpharetta, Ga.

[21] Appl. No.: 629,859

[22] Filed: Dec. 17, 1990

[51] Int. Cl.[5] .............................................. H01R 4/36
[52] U.S. Cl. .................................................. 439/810
[58] Field of Search ........................ 439/810, 811–814

[56] References Cited

U.S. PATENT DOCUMENTS

| | | |
|---|---|---|
| 1,025,246 | 5/1912 | Cole . |
| 1,267,457 | 5/1918 | Sachs . |
| 3,293,392 | 12/1966 | Cataldo et al. .................. 200/114 |
| 3,525,835 | 8/1970 | Norden . |
| 3,551,876 | 12/1970 | Walter ............................... 439/810 |
| 3,727,171 | 4/1973 | Coles et al. ....................... 439/810 |
| 3,840,717 | 10/1974 | Pekrul et al. . |
| 3,993,395 | 11/1976 | Taylor . |
| 4,288,138 | 9/1981 | Berry et al. ....................... 337/194 |
| 4,302,643 | 11/1981 | Cox et al. . |
| 4,432,594 | 2/1984 | Daggett . |
| 4,536,823 | 8/1985 | Ingram et al. .................... 361/355 |
| 4,801,278 | 1/1989 | Sappington ...................... 439/746 |
| 4,809,132 | 2/1989 | Palmieri et al. .................. 439/810 |
| 4,926,110 | 5/1990 | Yoon .................................. 439/621 |
| 4,950,195 | 8/1990 | Perreault et al. ................. 439/830 |

FOREIGN PATENT DOCUMENTS

| | | | |
|---|---|---|---|
| 3827911 | 3/1989 | Fed. Rep. of Germany ...... 439/810 |
| 2092398A | 8/1982 | United Kingdom . |

OTHER PUBLICATIONS

Square D brochure—QO Circuit Breaker Load Centers With Convertible Mains.

Primary Examiner—Gary F. Paumen
Attorney, Agent, or Firm—Peter A. Luccarelli, Jr.

[57] ABSTRACT

A lay-in lug (10) with a lug body (12) having a pair of generally parallel, opposed breaker stabs (14, 16) that are engageable in line contacts (44, 46) of a main circuit breaker (48) and securement flanges (20, 22) for attachment of the lug body to an electrical power distribution device. The lug (10) also has a lug cap (30) attachable to the lug body (12) for capture of an electrical cable (42). The lug cap (30) and lug body (12) are preferably formed by extrusion.

16 Claims, 3 Drawing Sheets

LAY-IN LUG

BACKGROUND OF THE INVENTION

The present invention is directed to lugs for establishing electrical continuity between a cable and an electrical distribution device. More particularly, the present invention is directed to a lay-in lug having a configuration which may be used for in so-called main lug or main breaker load center applications.

Load centers and similar electrical devices have bus bars which are connected to electrical power source cables. The bus bars are often connected to the power supply cables by a lug which captures an electrically conductive portion of the cable in a biased contact. Two common lug configurations are solid lugs, which have a bore into which a cable end is inserted. The cable is fixedly retained in the lug bore by a threaded allen head bolt. Another type of known lug is a so-called lay-in lug which has a two piece structure with each piece defining a slot. The cable is laid in the slot of a first portion of the lug. The second portion of the lug is attached to the first portion so that the cable is clamped between the two portions.

Both types of the above-described lugs have been used in main lug and main breaker-type load centers. In main lug load centers, the power cables are connected directly to conductive main or load bus bars, whereas in main breaker load centers, a circuit breaker is interposed between the cables and the load bus bars for circuit protection. In the past, each of the main lug and main breaker-type load centers required different lug designs or some type of adapter strap had to be fabricated to connect the lug to the main breaker line contacts.

U.S. Pat. No. 4,536,823, shows a connectable solid-type lug 22 or 24, which may be utilized in either main breaker or main lug load center applications. The lug 22 or 24 has lug base ledges 70, 72 which are captured in a channel 64 in load center base 14. The lug 22, 24 has a pair of upstanding ribs 122, 124 which are engageable in the line end contacts of a main breaker. A drawback in main lug applications is that the upstanding ribs 122, 124 add unnecessary length to the load center structure.

The lug shown in U.S. Pat. No. 4,536,823 is a cast structure which is relatively expensive to manufacture. It is desirable to utilize less expensive manufacturing processes, such as extrusion or stamping processes.

Another known way to utilize a single lug in both main lug and main breaker applications is to have a separate U-shaped structure with upstanding ribs attached to the lug, so that upstanding ribs can be inserted into main breaker line contacts. In one known example, the U structure has a finger or tongue, which is interposed in a bore in the lug between the cable and a rectangular extension similar to the one shown in the lug 22 in the lug of U.S. Pat. No. 4,536,823. A drawback to this solution is the need to inventory the additional U-shaped component in the manufacturing facility.

It is an object of the present invention to create a lay-in lug that can be extruded.

It is another object of the present invention to create a lug configuration that can be used in main breaker or main lug load centers, so as to eliminate the need for separate lug designs.

It is an object of the present invention to create a single lug configuration that can be utilized in main lug or main breaker load centers without the need for auxiliary brackets or adapters.

It is an object of the present invention to create a lay-in lug configuration that can be utilized in main lug or main breaker load centers, but that does not have excessive length in main lug applications.

SUMMARY OF THE INVENTION

The objects of the present invention have been attained by the lay-in lug of the present invention which comprises a lug body having a pair of generally parallel, opposed breaker stabs that are engageable in the line contacts of a main circuit breaker and means for attachment of the lug body to an electrical power distribution device, and a lug cap attachable to the lug body for capture of an electrical cable.

In another embodiment of the present invention, the lay-in lug comprises a lug body having a uniform cross-section with a pair of parallel, opposed breaker stabs that are engageable in line contacts of a main circuit breaker, a body flange on each breaker stab, and a anti-rotation and base mount securement for attachment of the lug body to an electrical power distribution device. The lug of this embodiment has a lug cap having a uniform cross-section with a pair of parallel, opposed cap ears, and a cap flange on each cap ear that is slidably engageable with the corresponding body flange on each breaker stab for capture of an electrical cable between the lug body and lug cap.

The preferred embodiment of the lug of the present invention has only three components, namely a lug body, a lug cap and an allen screw. By selecting one of two lengths of the lug body, the lug can be utilized in either of main lug or main breaker applications. In main lug applications, the lug body and lug cap have the same length, allowing compact design. In main breaker applications, the lug body is longer than the lug cap used in main lug applications, so that the projecting breaker stabs engage the main breaker line end contacts.

However, in either of main breaker or main lug applications, the lug body has the same cross-sectional configuration. The manufacturer can, for example extrude the lug body and cut it to a length suitable for either application. The lug cap and the threaded allen screw remain the same for either application.

DETAILED DESCRIPTION OF THE PREFERRED EMBODIMENTS

Figure 2:
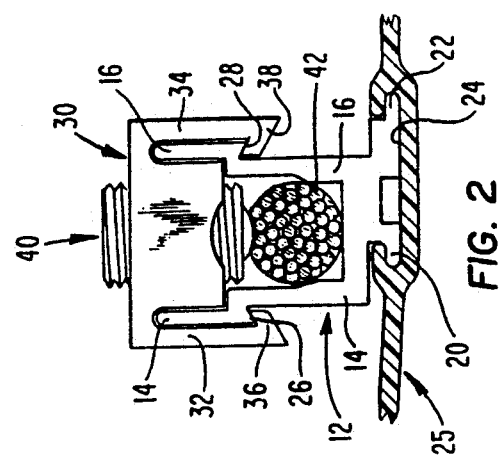
FIG. 2 is a front elevational view of the lug shown in FIG. 1 after assembly.
Figure 1:
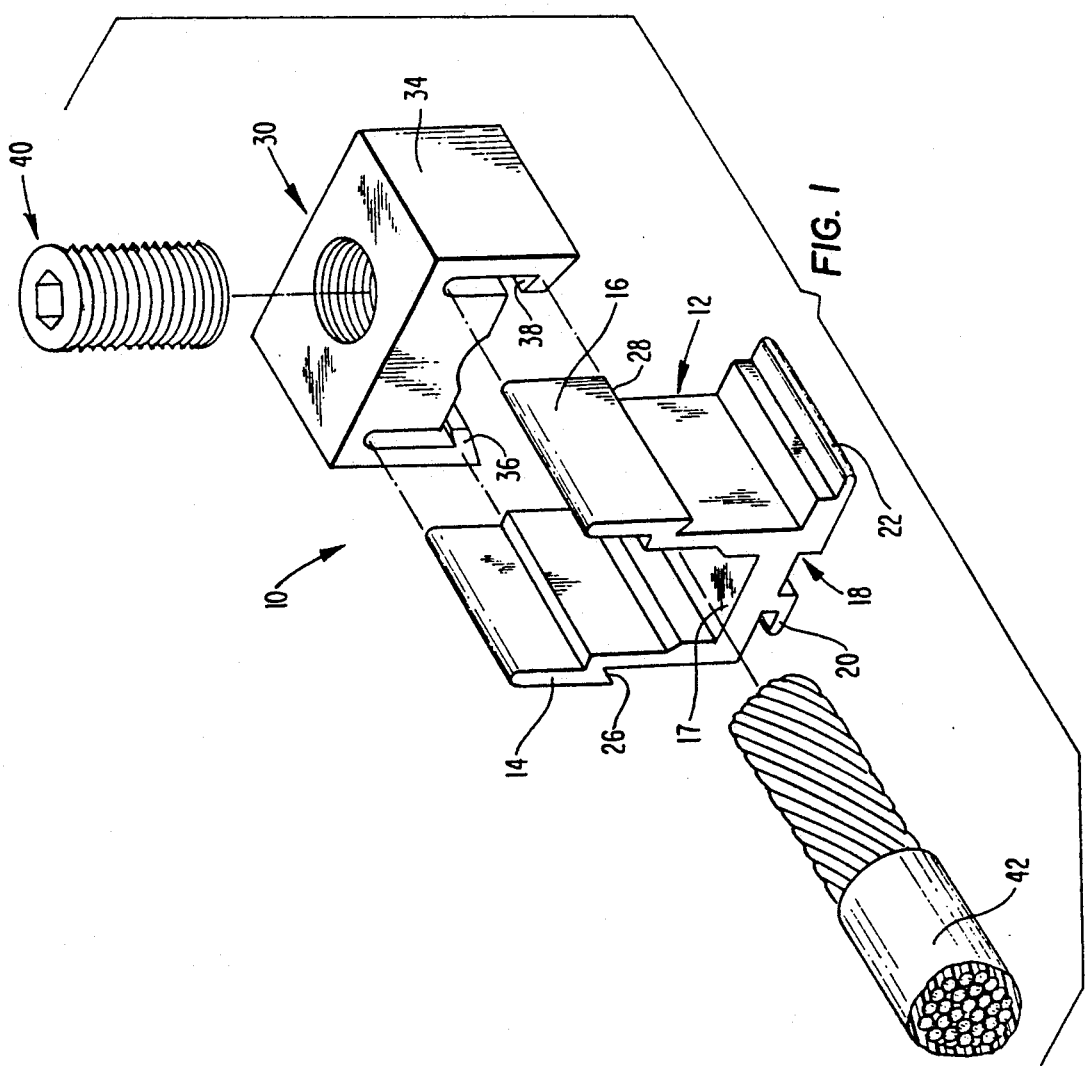
FIG. 1 shows a perspective exploded view of the lay-in lug of the present invention shown for use in a main lug application.

FIG. 1 shows a lay-in lug 10 having a lug body 12, with a pair of generally parallel, opposed breaker stabs 14, 16 that form a channel 17 between them. The lug 18 has an anti-rotation and base mount securement 18 which includes a pair of flanges 20, 22 that are secured to a load center base channel 24, as shown in FIG. 2. The lug body stabs 14, 16 each have a respective lug body flange 26, 28.

The lug 10 also has a lug cap 30 with a pair of generally parallel cap ears 32, 34 and a respective cap flange 36, 38. As shown in FIG. 2, each of the cap flanges 36, 38 engages a respective lug body flange 26, 28 of the lug body 12. Lug cap 30 also has an allen screw 40 threaded member for biasing an electrical cable 42 in the lug body channel 17, between the engaged lug cap 30 and lug body 12, as shown in FIG. 2. The allen screw 40 is preferably constructed in accordance with Underwriters Laboratories standards, if it is contemplated that the invention will be used in the United States of America. Other standards are applicable in other countries.

Figure 3:
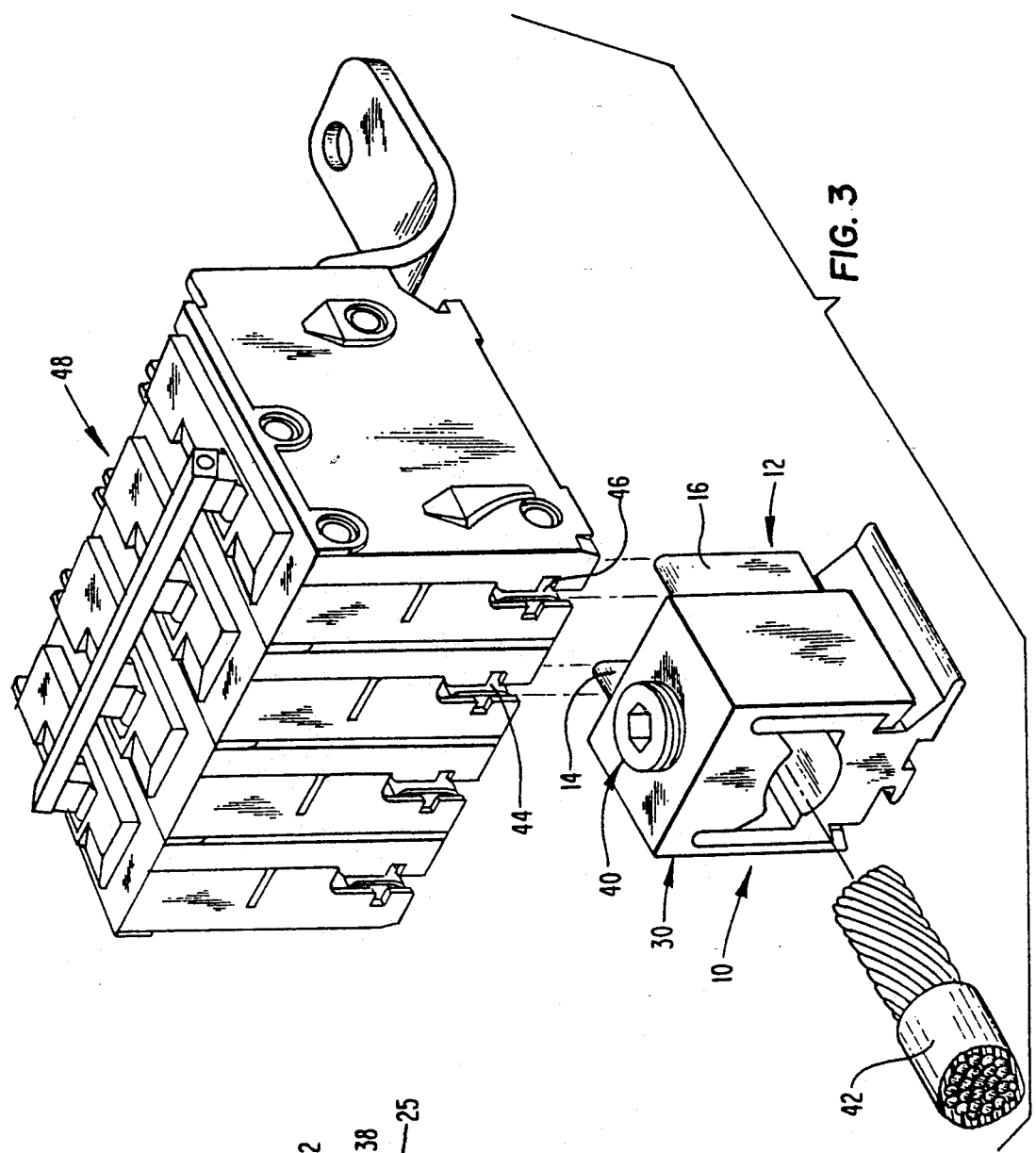
FIG. 3 is a perspective view of an alternate embodiment of the lay-in lug of the present invention shown for use in a main breaker application.
Figure 4:
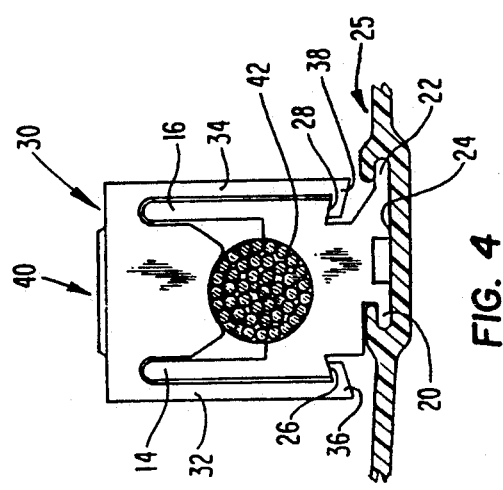
FIG. 4 is a front elevational view of the lug shown in FIG. 3.

FIGS. 3 and 4 show another embodiment of lug 10 which has a lug body 12 and lug cap 30, with slightly different cross-sectional profiles than the lug 10 embodiment shown in FIGS. 1 and 2. The lug 10 shown in FIGS. 3 and 4 has cylindrically profiled inner surfaces of the lug cap 30 and lug body 12 that conform to the outer circumference of cable 42 more than the ones shown in FIGS. 1 and 2. Otherwise, the structure of the respective lug embodiments of FIGS. 1 and 2 and FIGS. 3 and 4 have identical function, but slightly different geometrical dimensions and accordingly are identified with identical corresponding element numbers in this specification.

As is shown in FIG. 3, the lug body 12 stabs 14, 16 have a longer length than the lug cap 30 and are adapted for engagement in the line contacts 44, 46 of a main circuit breaker 48.

Disregarding differences in the cross-sectional profiles of the lugs 10 shown in FIGS. 1 and 2 with the lugs 10 of FIGS. 3 and 4, each has lug body stabs 14, 16 that are engageable in line contacts 44, 46 of a main circuit breaker. Main breaker line contact engagement is made possible by constructing the length of the lug body 12 greater than that of the lug cap 30. When breaker line end contact engagement is not an applications requirement, such as in main lug-type load centers, the lug body 12 is made shorter than the lug body for main breaker-type load centers, which conserves length in main lug load centers.

As shown in the respective embodiments of the FIGS. 1 and 2, in FIGS. 3 and 4, the lug cap 30 and lug body 12 preferably have uniform cross sections that are formed by an extrusion process for inexpensive manufacture. However, the lug cap 30 and lug body 12 can be constructed by casting, or by machining from bar stock or raw castings.

It is believed that manufacturing economy can be achieved by forming each of the lug cap 30 and lug body 12 as a bar extrusion and cutting caps and bodies from the extruded bars at desired lengths. The lug caps 30 can be cut at one fixed length and optimally, the lug bodies 12 are cut at the first length greater than that of the lug cap 30 for main breaker applications and at a shorter second length corresponding to that of lug cap 30 for main lug-type applications.

Figure 6:
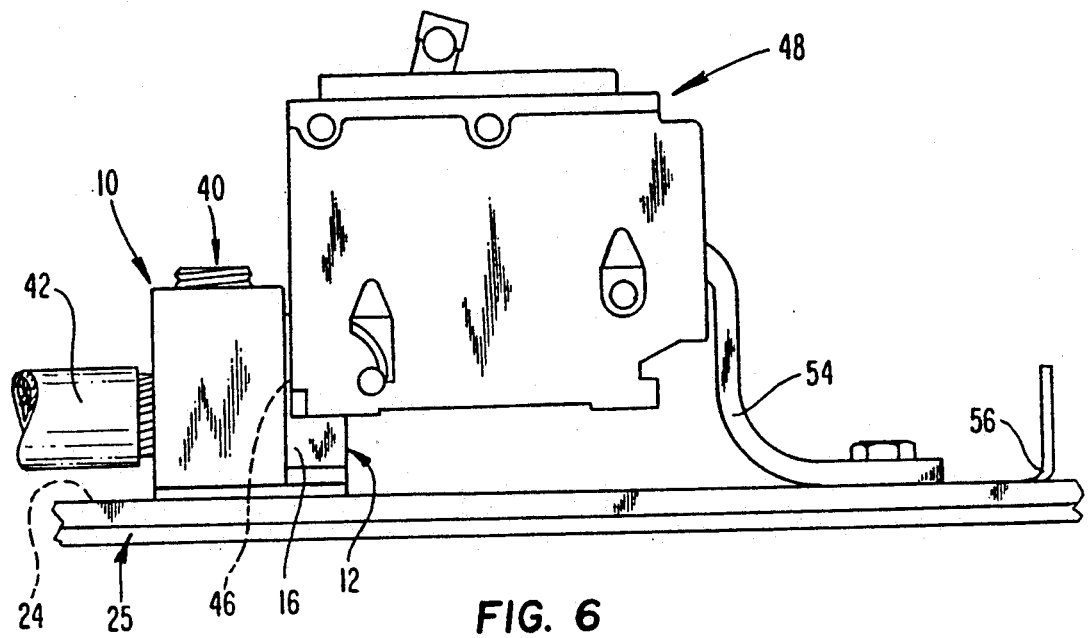
FIG. 6 is a side-elevational view of the lay-in lug of the present invention shown in a main breaker application.
Figure 5:
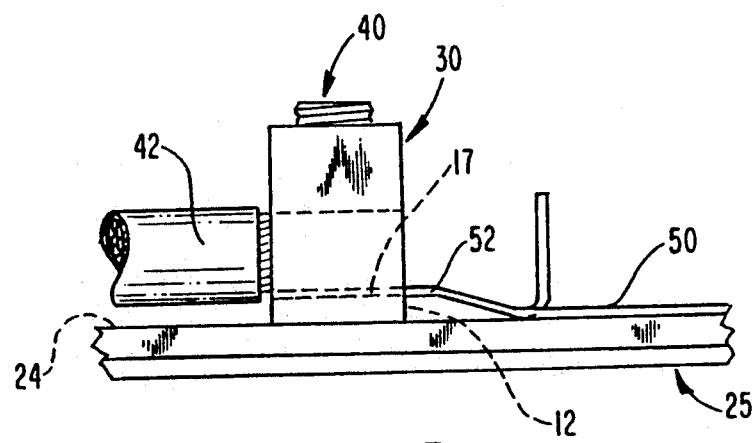
FIG. 5 is a side-elevational view of the lay-in lug of the present invention shown in a main lug application.

FIGS. 5 and 6 show application of the lug 10 of the present invention in main lug-type and main breaker-type load centers. Each of main lug- and main breaker-type load centers are generally shown in U.S. Pat. No. 4,536,823, the teachings of which are incorporated by reference as if fully set forth herein.

In FIG. 5, the lug 10 is inserted in the base channel 24 of base 25. The main bus 50 has a tongue 52 which is inserted into the lug body channel 17 between the lug body 12 and the cable 42. Tightening the allen screw 40 secures the cable 42, main bus tongue 52, lug body 12 and lug cap 30 relative to each other.

In the main breaker-type load center of FIG. 6, the lug 10 is shown connected to cable 42 and to the main breaker 48 line contact 46 by stab 16. The stab 14 connection to line contact 44 is not visible. The load end of main breaker 48 is connected to load strap 54, which is in turn connected to the main bus 56.

The foregoing description of the preferred embodiments is intended to illustrate without limitation the present invention. It is understood, of course, that changes and variations can be made therein without departing from the scope of the invention which is defined in the following claims.

What is claimed is:

1. A lay-in lug comprising:
    a lug body having a pair of generally parallel, opposed breaker stabs and means for attachment of the lug body to an electrical power distribution device; and
    a lug cap attachable to the lug body for capture of an electrical cable, where the stabs are directly engageable with line contacts of a main circuit breaker when the lug cap is attached to the lug body.

2. The lay-in of claim 1, wherein the means for attachment is an anti-rotation and base mount securement that is engageable in a track on a load center.

3. The lay-in lug of claim 1, wherein the lug body and lug cap have pairs of opposing engageable body flanges and cap flanges for attachment of the lug body to the lug cap.

4. The lay-in lug of claim 1, wherein the lug body has a uniform cross section.

5. The lay-in lug of claim 4, wherein the lug body is formed by extrusion.

6. The lay-in lug of claim 1, wherein the lug cap has a uniform cross section.

7. The lay-in lug of claim 6, wherein the lug cap is formed by extrusion.

8. A lay-in lug comprising:
    a lug body having a uniform cross section with a pair of parallel, opposed breaker stabs, a body flange on each breaker stab, and an anti-rotation and base mount securement for attachment of the lug body to an electrical power distribution device; and
    a lug cap having a uniform cross section with a pair of parallel, opposed cap ears, a cap flange on each cap ear that is slidably engageable with the corresponding body flange on each breaker stab, for capture of an electrical cable between the lug body and lug cap, where the stabs are directly engageable with line contacts of a main circuit breaker when the cap flanges are engaged with the body flanges.

9. The lay-in lug of claim 8, wherein the lug cap has a threaded member for biasing the electrical cable between the lug body and lug cap.

10. The lay-in lug of claim 8, wherein the lug body and lug cap are formed by extrusion.

11. A lay-in lug comprising:
    a lug body having a first breaker stab, and means for attachment of the lug body to an electrical power distribution device; and a lug cap attachable to the lug body for capture of an electrical cable, where the stab is directly engageable with a line contact of a main circuit breaker when the cap is attached to the body.

12. The lay-in lug of claim 11, wherein the means for attachment is an anti-rotation and base mount securement that is engageable in a track on the load center.

13. The lay-in lug of claim 11, the lug body further including a second breaker stab parallel and opposed to the first breaker stab, where the second breaker stab is directly engageable with a line contact of a main circuit breaker.

14. The lay-in lug of claim 11, wherein the lug body and lug cap have pairs of opposing engageable body flanges and cap flanges for attachment of the lug body to the lug cap.

15. The lay-in lug of claim 11, wherein the lug body has a uniform cross section.

16. The lay-in lug of claim 15, wherein the lug body is formed by extrusion.

* * * * *